United States Patent
Mahoney et al.

(10) Patent No.: US 9,160,387 B2
(45) Date of Patent: Oct. 13, 2015

(54) METHOD AND APPARATUS FOR NOISE CANCELING

(71) Applicant: MSTAR SEMICONDUCTOR, INC., Chupei (TW)

(72) Inventors: Dennis Mahoney, Greensboro, NC (US); Wael Al-Qaq, Oak Ridge, NC (US)

(73) Assignee: MSTAR SEMICONDUCTOR, INC., Chupei (TW)

( * ) Notice: Subject to any disclaimer, the term of this patent is extended or adjusted under 35 U.S.C. 154(b) by 212 days.

(21) Appl. No.: 13/916,962

(22) Filed: Jun. 13, 2013

(65) Prior Publication Data
US 2014/0370822 A1 Dec. 18, 2014

(51) Int. Cl.
*H04B 1/525* (2015.01)
*H04B 1/12* (2006.01)

(52) U.S. Cl.
CPC .................................... *H04B 1/126* (2013.01)

(58) Field of Classification Search
CPC ................................ H04B 1/525; H04B 15/00
USPC .......... 455/501, 63.1, 222, 67.13, 570, 114.2, 455/278.1; 370/317
See application file for complete search history.

(56) References Cited

U.S. PATENT DOCUMENTS

| | | | |
|---|---|---|---|
| 8,009,762 B1 | 8/2011 | Al-Qaq et al. | |
| 8,224,265 B1 | 7/2012 | Mahoney | |
| 8,284,721 B2 | 10/2012 | Chen et al. | |
| 8,576,690 B2 * | 11/2013 | Pierrugues et al. | 370/201 |
| 2002/0072344 A1 * | 6/2002 | Souissi | 455/296 |
| 2007/0182621 A1 * | 8/2007 | Fehrenbach et al. | 342/124 |
| 2007/0281620 A1 * | 12/2007 | Rubin et al. | 455/63.1 |
| 2008/0219377 A1 * | 9/2008 | Nisbet | 375/296 |
| 2011/0007623 A1 * | 1/2011 | Cendrillon et al. | 370/201 |
| 2011/0116490 A1 | 5/2011 | Wilhelmsson et al. | |
| 2011/0205986 A1 | 8/2011 | Medapalli | |
| 2011/0242969 A1 | 10/2011 | Dayal et al. | |
| 2011/0249603 A1 | 10/2011 | Rick et al. | |
| 2011/0279192 A1 * | 11/2011 | Nash et al. | 333/105 |
| 2011/0287720 A1 * | 11/2011 | Cox et al. | 455/63.1 |
| 2011/0298685 A1 * | 12/2011 | Schmidhammer | 343/861 |
| 2012/0170766 A1 * | 7/2012 | Alves et al. | 381/71.11 |
| 2012/0282866 A1 * | 11/2012 | Thompson | 455/74 |
| 2014/0073258 A1 * | 3/2014 | Burchill et al. | 455/63.1 |
| 2014/0194071 A1 * | 7/2014 | Wyville | 455/73 |
| 2014/0376420 A1 * | 12/2014 | Zhou et al. | 370/278 |

* cited by examiner

*Primary Examiner* — Minh D Dao
(74) *Attorney, Agent, or Firm* — Oliff PLC

(57) ABSTRACT

Aspects of the disclosure can provide a circuit to be used in a device. The circuit includes a first receiver circuit, a second receiver circuit and a processing circuit. The first receiver circuit is configured to receive a first signal from an antenna that captures a combination of a target signal transmitted from another device to the device and an output signal driven by a transmitter in the device. The second receiver circuit is configured to receive a second signal generated based on to the output signal. The processing circuit is configured to cancel from the first signal noise due to the output signal based on the second signal.

22 Claims, 4 Drawing Sheets

METHOD AND APPARATUS FOR NOISE CANCELING

BACKGROUND

An electronic device can include multiple wireless communication systems. In an example, a mobile phone can include a cellular transceiver and a Bluetooth transceiver coexistent in the mobile phone. The cellular transceiver communicates wirelessly with a base station. The Bluetooth transceiver communicates with another Bluetooth device wirelessly. The cellular transceiver and the Bluetooth transceiver can operate at the same time.

SUMMARY

Aspects of the disclosure can provide a circuit to be used in a device. The circuit includes a first receiver circuit, a second receiver circuit and a processing circuit. The first receiver circuit is configured to receive a first signal from an antenna that captures a combination of a target signal transmitted from another device to the device and an output signal driven by a transmitter in the device. The second receiver circuit is configured to receive a second signal generated based on to the output signal. The processing circuit is configured to cancel from the first signal noise due to the output signal based on the second signal.

According to an embodiment of the disclosure, the second receiver is configured to receive the second signal via a coupler that couples the second signal to the output signal. In an example, the coupler is a directional coupler with different coupling factors for different signal directions.

Further, in an embodiment, the circuit can include a controller configured to turn on the second receiver circuit when a received signal strength indication (RSSI) of the first receiver circuit is lower than a threshold.

According to an aspect of the disclosure, the first receiver circuit is configured to down-convert the first signal into baseband, the second receiver circuit is configured to down-convert the second signal into baseband, and the processing circuit is configured to perform baseband processing to cancel the noise from the first signal. Further, the first receiver circuit and the second receiver circuit have matching circuit components, and are configured to down-convert the first signal and the second signal based on a same local oscillation signal.

Aspects of the disclosure provide a method for a device to receive a wireless signal. The method includes receiving a first signal from an antenna that captures a combination of the wireless signal transmitted from another device to the device and an output signal by the device, receiving a second signal generated based on the output signal, and cancelling from the first signal noise due to the output signal based on the second signal.

Aspects of the disclosure can also provide an apparatus. The apparatus includes a transmitter, a first receiver path, a second receiver path, a coupler and a noise cancellation module. The transmitter is configured to transmit an output signal. The first receiver path is configured to receive a first signal from an antenna that captures a combination of a target signal transmitted from another apparatus to the apparatus and the output signal. The coupler is configured to generate a second signal based on the output signal. The second receiver path is configured to receive the second signal. The noise cancellation module is configured to cancel from the first signal noise due to the output signal based on the second signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
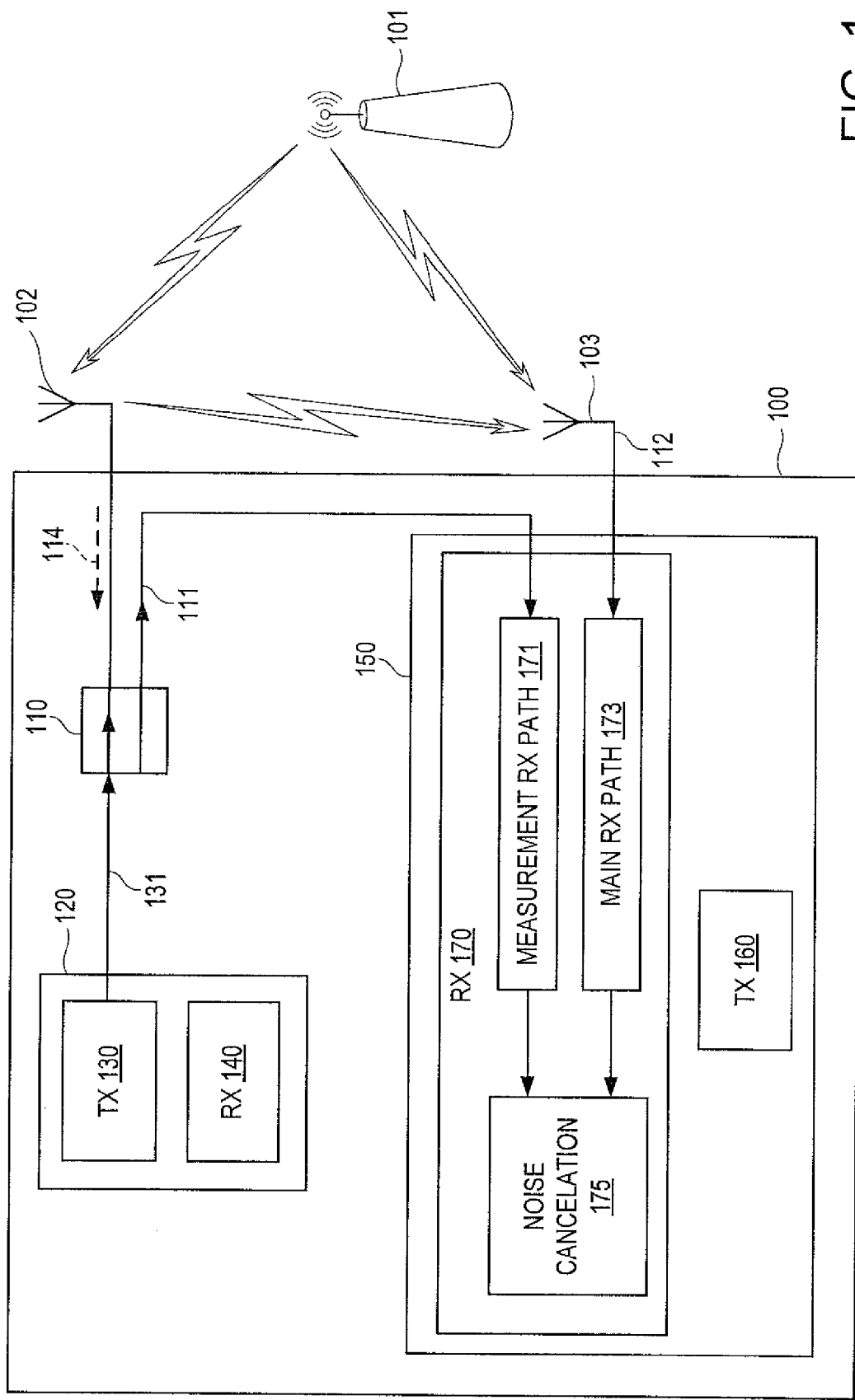
FIG. 1 shows a block diagram of an exemplary electronic system 100 according to an embodiment of the disclosure.

FIG. 1 shows a block diagram of an exemplary electronic system 100 according to an embodiment of the disclosure. The electronic system 100 includes a first transceiver 120 and a second transceiver 150 coexistent in the system. Further, the electronic system 100 includes a component, such as a directional coupler 110, configured to assist radio coexistence cancellation to improve receiving quality. These elements are coupled together as shown in FIG. 1.

The electronic system 100 can be any suitable electronic device, such as a mobile phone, a tablet, a laptop computer, a desktop computer, and the like, that includes multiple transceivers, such as the transceivers 120 and 150, that are coexistent in the device. According to an aspect of the disclosure, the two transceivers 120 and 150 can perform wireless communication simultaneously, and one of the transceivers can cause interference with the other transceiver.

In an example, one of the transceivers 120 and 150 is a long term evolution (LTE) transceiver that operates according to third generation partnership project (3GPP) specifications, and the other is a WiFi transceiver or a Bluetooth transceiver that operates in an industrial-scientific-medical (ISM) band. The LTE transceiver can operate in a band that is close to the ISM band, such as band 40 and the like, and thus the two transceivers may interfere with each other when they operate simultaneously.

In another example, one of the transceivers 120 and 150 is a cellular transceiver, such as a 2G cellular transceiver, a 3G cellular transceiver, a 4G cellular transceiver, and the like that transmits or receives cellular signals, and the other is a WiFi transceiver or a Bluetooth transceiver that operates in the ISM band. In an example, harmonics of the cellular signals can fall in the ISM band. Then, self-mixing of the cellular signals due to second order intercept point (IP2) can cause the two transceivers to interfere with each other when they operate simultaneously.

In another example, generally, transceivers convert radio signals to intermediate frequency, or baseband frequency based on a local oscillator. The local oscillator can have noise frequency components. The noise frequency components of the local oscillator can induce reciprocal mixing effect. The reciprocal mixing effect can cause the two transceivers to interfere with each other when they operate simultaneously.

In the FIG. 1 example, the transceiver 120 includes a transmitter (TX) 130 and a receiver (RX) 140 coupled to a first antenna 102 to transmit and/or receive signals according to a first wireless communication standard, such as a LTE standard, and the transceiver 150 includes a transmitter (TX) 160 and a receiver (RX) 170 coupled to a second antenna 103 to transmit and/or receive signals according to a second wireless communication standard, such as a WiFi standard.

Specifically, in an example, the transceiver 120 communicates with a second device (not shown), and the transceiver 150 communicates with a third device 101 simultaneously. At a time, the transmitter 130 transmits an output signal 131 to the second device wirelessly, and at the same time, the receiver 170 receives a target signal transmitted from the third device wirelessly to the electronic system 100. Both the output signal and the target signal propagate in the air as electromagnetic waves, and can be captured by the second antenna 103. Then, the second antenna 103 generates a first electrical signal 112 in response to the captured electromagnetic waves. The first electrical signal 112 may be a combination of the output signal and the target signal. The first electrical signal 112 is processed by the receiver 170 to extract the target signal.

According to an embodiment of the disclosure, the electronic system 100 includes a coupler, such as the directional coupler 110, to provide a second electrical signal 111 to the receiver 170 based on the output signal 131, thus that the receiver 170 can extract the target signal from the first electrical signal 112 based on the second electrical signal 111.

In this embodiment, the directional coupler 110 includes two transmission lines, such as a main line and a coupled line, coupled together. The directional coupler 110 can receive the output signal 131 for transmission from the transmitter 130, power-divides the output signal 131 onto the main line and the coupled line $|_{[AC1]}$. For example, the main line transmits a large portion of the output signal 131 to the antenna 102, and the coupled line transmits a small portion of the output signal 131 to the receiver 170.

It is noted that the main line can transmit signals in both directions. For example, the main line includes a first terminal connected with the transceiver 120 and a second terminal connected with the antenna 102. The main line can transmit signals, such as the output signal 131, in a first direction from the first terminal to the second terminal, and can also transmit signals, such as a signal 114 captured by the antenna 102, in a second direction from the second terminal to the first terminal. Thus, the second electrical signal 111 is generated in response to the output signal 131 and the signal 114.

According to an embodiment of the disclosure, the directional coupler 110 has a relatively large directivity that couples signals transmitted in different directions with different coupling factors. For example, the output signal 131 is coupled from the main line to the coupled line with a first coupling factor, and the signal 114 is coupled from the main line to the coupled line with a second coupling factor. The two coupling factors can be different. In an example, the directional coupler 110 is configured to have a directivity over 10 dB, such that the first coupling factor is much larger than the second coupling factor. When the directivity is large enough, the signal portion in the second electrical signal 111 due to the signal 114 can be ignored, and the second electrical signal 111 can be considered as a copy of the output signal 131.

According to an aspect of the disclosure, the receiver 170 includes two receiver paths to process the first electrical signal 112 and the second electrical signal 111, and then based on the processed signals, noises due to the output signal 131 can be removed, and the target signal can be extracted.

In the FIG. 1 embodiment, the receiver 170 includes a main receiver path 173, a measurement receiver path 171 and a noise cancellation module 175. The main receiver path 173 is coupled to the antenna 103 to receive the first electrical signal 112, and conduct various operations, such as filtering, amplifying, mixing, down converting, sampling, analog to digital converting, and the like, to process the first electrical signal 112. The measurement receiver path 171 is configured to receive the second electrical signal 111 from the coupler 110 and conduct various operations, such as filtering, amplifying, mixing, down converting, sampling, analog to digital converting, and the like, to process the second electrical signal.

In an embodiment, the measurement receiver path 171 and the main receiver path 173 include equivalent or matching components that are identically or similarly configured, such that the first electrical signal 112 and the second electrical signal 111 can be processed in the same manner, and frequency components due to the output signal 131 and due to the processing of the output signal 131, such as self-mixing due to IP2, reciprocal mixing, and the like, similarly exist in the processed signals.

The noise cancellation module 175 is configured to suitably extract the target signal based on the two processed signals by the main receiver path 173 and the measurement receiver path 171. For example, the noise cancellation module 175 correlates the two processed signals to determine time and phase difference, and amplitude difference of the two processed signals, then the noise cancellation module 175 scales the processed signals, and time shifts and phase shifts the processed signals. Finally, the noise cancellation module 175 can remove noises due to the output signal 131 and the processing of the output signal 131.

Figure 2:
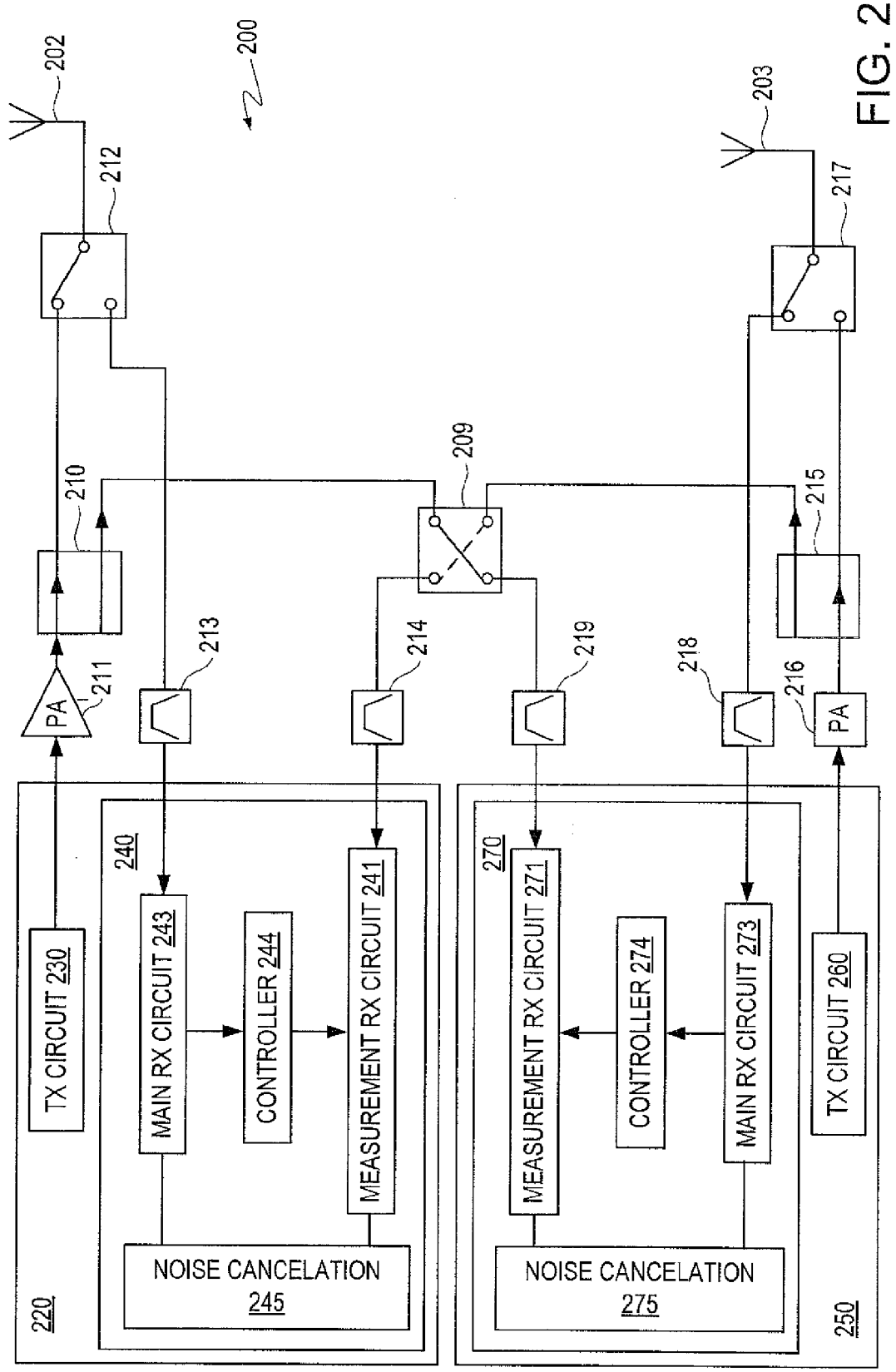
FIG. 2 shows a block diagram of an exemplary electronic system 200 according to an embodiment of the disclosure.

FIG. 2 shows a block diagram of an electronic system 200 according to an embodiment of the disclosure. The electronic system 200 includes two transceivers coexistent in the system, and directional couplers 210 and 215 configured to assist radio coexistence cancellation to improve receiving quality.

In the FIG. 2 example, the electronic system 200 includes a first transceiver formed by a first integrated circuit (IC) chip 220 coupled with off-chip components, such as a power amplifier (PA) 211, two surface acoustic wave (SAW) filters 213 and 214, and a second transceiver formed by a second IC chip 250 coupled with off-chip components, such as a power amplifier (PA) 216, two SAW filters 218 and 219. Further, the electronic system 200 includes switches 212, 209 and 217, and two antennas 202 and 203. These elements are coupled together as shown in FIG. 2.

The first transceiver is coupled to the antenna 202 via the switch 212 to transmit or receive signals according to a first wireless communication standard, such as a LTE standard, and the like. The second transceiver is coupled to the antenna 203 to transmit or receive signals according to a second wireless communication standard, such as a WiFi standard, and the like. The two transceivers can interfere with each other when they operate simultaneously.

According to an aspect of the disclosure, the receiving portions of the two transceivers are similarly configured as the receiver 170 in FIG. 1. When interference exists, noise canceling can be performed in the same manner as in the electronic system 100.

Specifically, the first IC chip 220 integrates various circuits for the first transceiver. For example, the first IC chip 220 includes a transmitter circuit 230, a receiver circuit 240. The receiver circuit 240 includes a main receiver circuit 243, a measurement receiver circuit 241, a controller 244 and a noise cancellation module 245.

The transmitter circuit 230 is coupled with the power amplifier 211 to form a first transmitter path. The main receiver circuit 243 is coupled with the SAW filter 213 to form a first main receiver path. The first transmitter path and the first main receiver path are coupled with the antenna 202 via the switch 212. The switch 212 can be controlled to couple the first transmitter path to the antenna 202, such that the antenna 202 transmits an output signal provided by the first transmitter path as electromagnetic waves into the air. In addition, the switch 212 can be controlled to couple the first main receiver path to the antenna 202, such that the first main receiver path receives an electrical signal generated by the antenna 202 in response to captured electromagnetic waves in the air, and processes the electrical signal.

The measurement receiver circuit 241 is coupled with the SAW filter 214 to form a first measurement receiver path. The first measurement receiver path can be coupled to the directional coupler 215 via the switch 209. The first measurement receiver path and the first main receiver path can be similarly configured as the measurement receiver path 171 and the main receiver path 173 in FIG. 1. The noise cancellation module 245 can be similarly configured as the noise cancellation module 175. The description of these components has been provided above and will be omitted here for clarity purposes.

The first main receiver path and the first measurement receiver path can be configured to have similar or same characteristics. For example, the SAW filters 213 and 214 are matching filters that have about the same filtering characteristics to filter the incoming signals of a same band and reduce noise power. The main receiver circuit 243 and the measurement receiver circuit 241 use matching components that are configured to have similar or same characteristics.

The controller 244 controls the first measurement receiver path based on signals in the first main receiver path. In an example, when the controller 244 detects that the received signal strength indication (RSSI) of the first main receiver path is lower than a threshold, the controller 244 can enable the first measurement receiver path; and when the controller 244 detects that the RSSI of the first main receiver path is higher than the threshold, the controller 244 can disable the first measurement receiver path to save power.

Similarly, the second IC chip 250 integrates various circuits for the second transceiver. For example, the second IC chip 250 includes a transmitter circuit 260, a receiver circuit 270. The receiver circuit 270 includes a main receiver circuit 273, a measurement receiver circuit 271, a controller 274 and a noise cancellation module 275.

The transmitter circuit 260 is coupled with the power amplifier 216 to form a second transmitter path. The main receiver circuit 273 is coupled with the SAW filter 218 to form a second main receiver path. The second transmitter path and the second main receiver path are coupled with the antenna 203 via the switch 217. The switch 217 can be controlled to couple the second transmitter path to the antenna 203, such that the antenna 203 transmits an output signal provided by the second transmitter path as electromagnetic waves into the air. In addition, the switch 217 can be controlled to couple the second main receiver path to the antenna 203, such that the second main receiver path receives an electrical signal generated by the antenna 203 in response to captured electromagnetic waves in the air, and processes the electrical signal.

The measurement receiver circuit 271 is coupled with the SAW filter 219 to form a second measurement receiver path. The second measurement receiver path can be coupled to the directional coupler 210 via the switch 209. The second measurement receiver path and the second main receiver path can be similarly configured as the measurement receiver path 171 and the main receiver path 173 in FIG. 1. The noise cancellation module 275 can be similarly configured as the noise cancellation module 175. The description of these components has been provided above and will be omitted here for clarity purposes.

The second main receiver path and the second measurement receiver path can be configured to have similar or same characteristics. For example, the SAW filters 218 and 219 are matching filters that have about the same filtering characteristics to filter the incoming signals of a same band and reduce noise power. The main receiver circuit 273 and the measurement receiver circuit 271 use matching components that are configured to have similar or same characteristics.

The controller 274 controls the second measurement receiver path based on the signal processing in the second main receiver path. In an example, when the controller 274 detects that the received signal strength indication (RSSI) of the second main receiver path is lower than a threshold, the controller 274 can enable the second measurement receiver path; and when the controller 274 detects that the RSSI of the second main receiver path is higher than the threshold, the controller 274 can disable the second measurement receiver path to save power.

During operation, in an example, when the two transceivers do not interfere with each other, the first and second measurement receiver paths in both transceivers can be disabled to save power. When the two transceivers interfere, generally, one of the two transceivers is an aggressor that affects signal reception sensitivity of the other transceiver. Then, one of the first and second measurement receiver paths can be enabled to improve the signal reception sensitivity.

Specifically, in an embodiment, the first transceiver is a LTE transceiver that communicates with a base station (not shown), and the second transceiver is a WiFi transceiver that communicates with an access point. In an example, the LTE transceiver operates in band 40 which is close to the ISM band of the WiFi transceiver, and thus when the two transceivers operate simultaneously, they can interfere with each other.

In an embodiment, the interference is detected and the electronic system 200 is configured to cancel noise due to coexistence in order to improve receiving quality. The interference can be detected by any suitable technique. In an example, the controller 244 monitors a RSSI from the main receiver circuit 243. When the RSSI is lower than a threshold, the controller 244 detects the interference, and determines that the second transceiver is an aggressor that interferes with the first transceiver. Then, the controller 244 can turn on the measurement receiver circuit 241. In addition, the controller 244 can output a signal to control the switch 209 to appropriately switch, and provide a coupled signal corresponding to the output signal for transmission by the second transceiver.

Similarly, the controller 274 monitors a RSSI from the main receiver circuit 273. When the RSSI is lower than a threshold, the controller 274 detects the interference, and determines that the first transceiver is an aggressor that interferes with the second transceiver. Then, the controller 274 turns on the measurement receiver circuit 271. In addition, the controller 274 can output a signal to control the switch 209 to appropriately switch, and provide a coupled signal corresponding to the output signal for transmission by the first transceiver.

According to an embodiment of the disclosure, the electronic system 200 can be implemented with low cost. In an example, in the FIG. 2 example, the first transmitter and the second transmitter do not need expensive filters, such as bulk acoustic wave (BAW) filters, SAW filters, and the like at the transmitter output. It should be understood that those filters may be used to further improve performance.

Further, according to an aspect of the disclosure, the electronic system 200 does not need a guard band, and thus can outperform other systems when a guard band is not allowed.

It should be understood that the noise cancellation can be performed at various stages of the signal processing, such as analog stage, digital stage, and the like.

Figure 3:
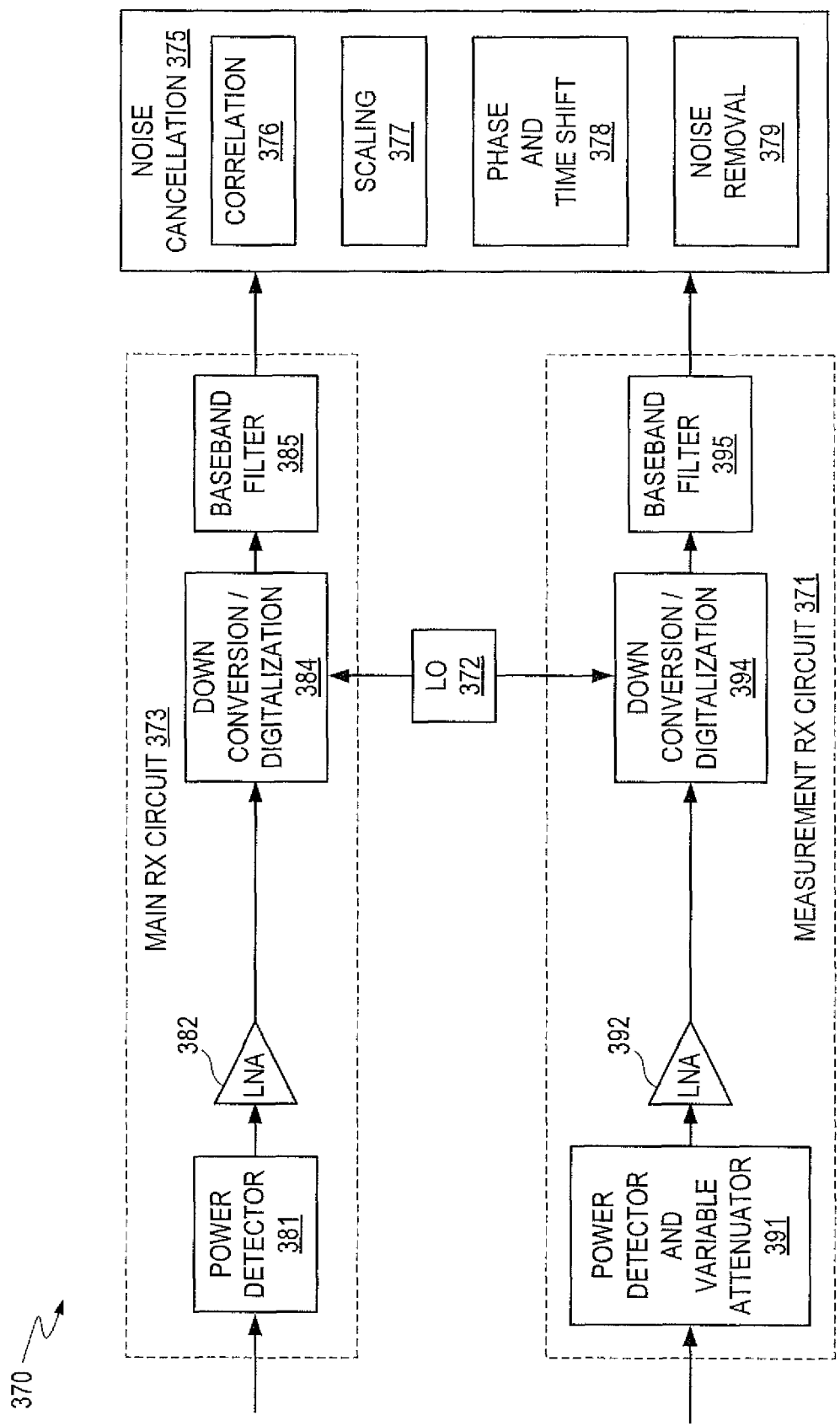
FIG. 3 shows a block diagram of an exemplary receiver 370 according to an embodiment of the disclosure.

FIG. 3 shows a block diagram of an exemplary receiver circuit 370 according to an embodiment of the disclosure. The receiver circuit 370 can be used in FIG. 2 example as the receiver circuit 240 or the receiver circuit 270. The receiver circuit 370 includes a main receiver circuit 373, a measurement receiver circuit 371, and a noise cancellation module 375. These elements are coupled together as shown in FIG. 3.

The main receiver circuit 373 and the measurement receiver circuit 371 can include matching components that are similarly or identically configured. In the FIG. 3 example, the main receiver circuit 373 includes a power detector 381, a low noise amplifier (LNA) 382, a down conversion/digitalization module 384, and a baseband filter 385 coupled together as shown in FIG. 3. The measurement receiver circuit 371 includes a power detector and variable attenuator 391, a low noise amplifier (LNA) 392, a down conversion/digitalization module 394, and a baseband filter 395 coupled together as shown in FIG. 3.

The main receiver circuit 373 receives a first signal provided by an antenna that captures electromagnetic waves in the air. Thus, the first signal combines a target signal transmitted from another device, and an output signal transmitted from a transceiver coexistent in the same device. The power detector 381 can detect a power level of the first signal. The LNA 382 amplifies the first signal.

Based on the amplified first signal, the down conversion/digitalization circuit 384 generates a first digital stream in baseband corresponding to the first signal. The first digital stream is then processed in baseband by various baseband processing techniques. For example, the baseband filter 385 performs signal filtering in baseband, and outputs a first filtered baseband digital stream.

Similarly, the measurement receiver circuit 371 receives a second signal provided by a directional coupler (not shown) that generates the second signal based on the output signal of the transceiver coexistent in the same device. The power detector and the variable attenuator 391 can detect the power level of the second signal, and scale the second signal. In an example, the power detector and variable attenuator 391 scales the second signal based on the power level of the first signal, such that the two signals are about the same power level, and thus the further processing circuits can be similarly configured. The LNA 392 amplifies the second signal.

Based on the amplified second signal, the down conversion/digitalization circuit 394 generates a second digital stream in baseband corresponding to the second signal. The second digital stream is then processed in baseband by various baseband processing techniques. For example, the baseband filter 385 performs signal filtering in baseband, and outputs a second filtered baseband digital stream.

According to an embodiment of the disclosure, due to the matching components, the output signal of the transceiver coexistent in the same device can be processed in the same manner, both the first filtered baseband digital stream and the second filtered baseband digital stream have components due to the output signal, and due to self-mixing of the output signal via IP2. In addition, the receiver circuit 370 uses a same local oscillator module LO 372 to provide same local oscillation signal to both the down conversion digitalization 384 and the down conversion digitalization 394, such that the reciprocal mixing due to noise in the local oscillation signal exists in both the first filtered baseband digital stream and the second filtered baseband digital stream.

The first filtered baseband digital stream and the second filtered baseband digital stream are provided to the noise cancellation module 375 to perform noise cancellation in baseband. In an example, the noise cancellation module 375 is implemented as a baseband processor executing software instructions to perform the noise cancellation. In the FIG. 3 example, the noise cancellation module 375 includes a correlation module 376, a scaling module 377, a phase and time shift module 378 and a noise removal module 379. The correlation module 376 can correlate the two digital streams output from the main receiver circuit 373 and the measurement receiver circuit 371 to determine any difference, such as phase difference, time difference, amplitude difference, and the like.

The scaling module 377 suitably scales one of the digital streams or both of the digital streams, such that the correlated portions have about the same amplitude.

The phase and time shift module 378 suitably time-shifts or phase-shifts one of the digital streams or both of the digital streams to align the two digital streams in time or in phase.

The noise removal module 379 suitably removes the noise portions of the first digital stream that correspond to components of the second digital stream.

It should be understood that the main receiver circuit 373 and the measurement receiver circuit 371 can include other suitable matching components, such as matching band-pass filters, and the like.

Figure 4:
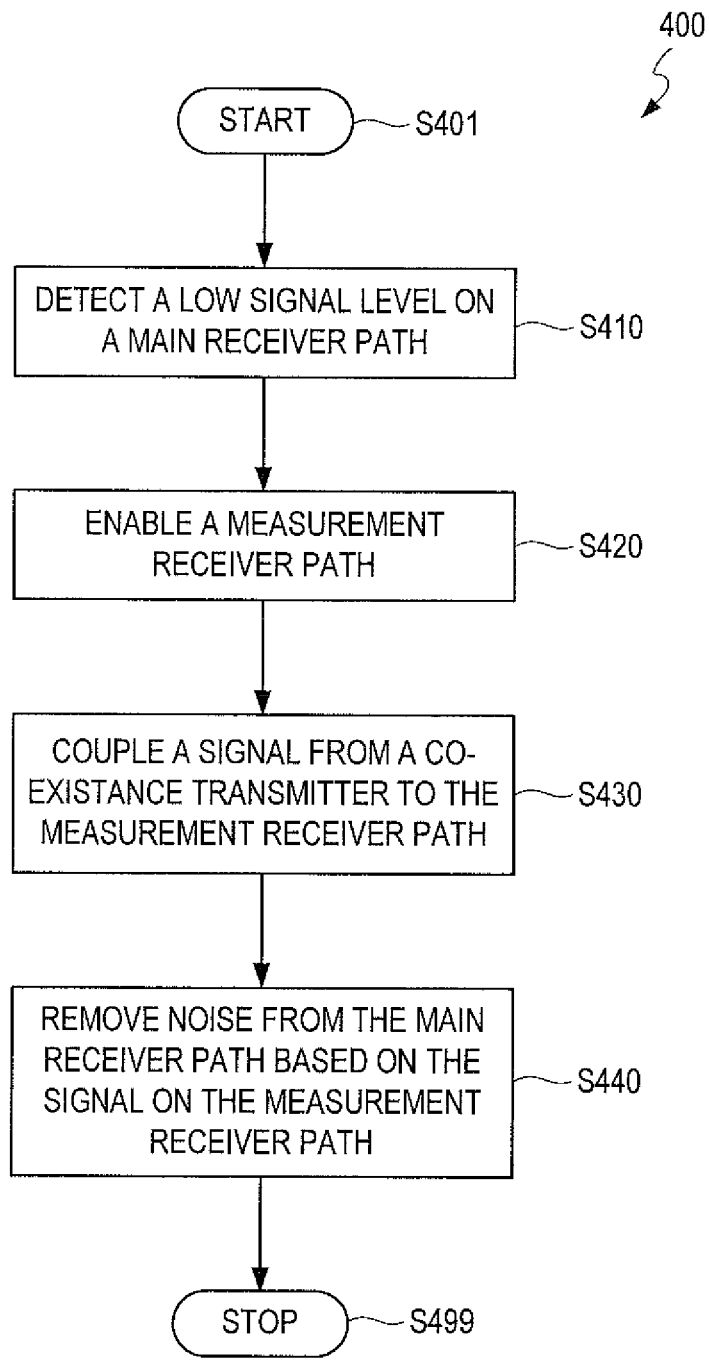
FIG. 4 shows a flow chart outlining an exemplary process 400 according to an embodiment of the disclosure.

FIG. 4 shows a flow chart outlining an exemplary process 400 according to an embodiment of the disclosure. The process 400 can be executed by the first transceiver or the second transceiver in the FIG. 2 example. The process starts at S401 and proceeds to S499.

At S410, a low signal level is detected on a main receiver path. For example, in the FIG. 2 example, the second main receiver path receives a first signal generated by the antenna 203 in response to electromagnetic waves in the air. Thus, the first signal combines a target signal transmitted by a remote device to the second transceiver, and an output signal transmitted by the first transmitter path. The output signal can affect the signal strength of the target signal in the first signal. The main receiver circuit 273 can determine an RSSI that indicates the signal strength of the target signal in the first signal. The controller 274 can monitor the RSSI. When the RSSI is lower than a threshold, the controller 274 detects the low signal level on the second main receiver path.

At S420, a measurement receiver path is enabled. In the FIG. 2 example, when the RSSI is higher than the threshold, the controller 274 disables a power grid to stop providing electrical power to the measurement receiver circuit 271 in order to save power. When the RSSI is lower than the threshold, the controller 274 can determine that the first transceiver is an aggressor that interferes with the second transceiver. The controller 274 then enables the power grid to provide electrical power to the measurement receiver circuit 271. In addition, the controller 274 provides a control signal to switch the switch 209 accordingly.

At S430, an output signal from a coexistence transmitter is coupled to the measurement receiver path. In the FIG. 2 example, the directional coupler 210 generates a second signal based on the output signal from the first transmitter path. The second signal is provided to the second measurement receiver path via the switch 209.

At S440, noise portions in the main receiver path are removed based on the coupled signal on the measurement receiver path. In the FIG. 2 example, the second main receiver path and the second measurement receiver path are similarly configured, such that signal components due to the output signal, such as the output signal component, the output signal self-mixing component via IP2, reciprocal mixing component due to local oscillator noise, and the like, exist in both the first processed signal by the second main receiver path, and the second processed signal by the second measurement receiver path. Those signal components are the noise portions in the first processed signal due to the output signal. Based on the second processed signal, the noise portions can be removed from the first processed signal, and then the target signal can be extracted. The process then proceeds to S499 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit in a device, comprising:
a transceiver circuit, comprising:
a first receiver circuit, configured to receive a first signal from an antenna that captures a combination of a target signal transmitted from outside the device and an output signal driven by a transmitter outside the transceiver circuit in the device;
a second receiver circuit configured to receive a second signal generated based on the output signal;
a processing circuit configured to cancel from the first signal noise due to the output signal based on the second signal; and
a controller configured to turn on the second receiver circuit when a received signal strength indication (RSSI) of the first receiver circuit is lower than a threshold.

2. The circuit of claim 1, further comprising:
another transceiver circuit, comprising the transmitter configured to transmit the output signal;
a coupler that couples the second signal to the output signal.

3. The circuit of claim 2, wherein the coupler comprises a directional coupler with different coupling factors for different signal directions.

4. A circuit in a device, comprising:
a transceiver circuit, comprising:
a first receiver circuit, configured to receive a first signal from an antenna that captures a combination of a target signal transmitted from outside the device and an output signal driven by a transmitter outside the transceiver circuit in the device;
a second receiver circuit configured to receive a second signal generated based on the output signal; and
a processing circuit configured to cancel from the first signal noise due to the output signal based on the second signal, wherein:
the first receiver circuit is configured to down-convert the first signal into baseband;
the second receiver circuit is configured to down-convert the second signal into baseband; and
the processing circuit is configured to perform baseband processing to cancel the noise from the first signal.

5. The circuit of claim 4, wherein the first receiver circuit and the second receiver circuit have matching filters.

6. The circuit of claim 4, wherein the first receiver circuit and the second receiver circuit are configured to down-convert the first signal and the second signal based on a same local oscillation signal.

7. The circuit of claim 5, further comprising:
another transceiver circuit, comprising the transmitter configured to transmit the output signal;
a coupler that couples the second signal to the output signal.

8. The circuit of claim 7, wherein the coupler comprises a directional coupler with different coupling factors for different signal directions.

9. A method for a device to receive a wireless signal, comprising:
receiving a first signal from an antenna that captures a combination of the wireless signal transmitted from outside the device and an output signal transmitted by the device;
receiving a second signal generated based on the output signal;
cancelling from the first signal noise due to the output signal based on the second signal;
detecting a received signal strength indication (RSSI) of the wireless signal in the first signal; and
receiving the second signal when the RSSI is lower than a threshold.

10. The method of claim 9, further comprising:
receiving the second signal via a coupler that couples the second signal to the output signal.

11. The method of claim 10, further comprising:
receiving the second signal via a directional coupler with different coupling factors for different signal directions.

12. A method for a device to receive a wireless signal, comprising:
receiving a first signal from an antenna that captures a combination of the wireless signal transmitted from outside the device and an output signal transmitted by the device;
receiving a second signal generated based on the output signal;
cancelling from the first signal noise due to the output signal based on the second signal;
down-converting the first signal into a first baseband signal;
down-converting the second signal into a second baseband signal; and
processing the first baseband signal and the second baseband signal to cancel the noise.

13. The method of claim 12, further comprising:
down-converting the first signal and the second signal based on a same local oscillation signal.

14. The method of claim 12, further comprising:
filtering the first signal and the second signal with matching filters.

15. The method of claim 12, further comprising:
receiving the second signal via a coupler that couples the second signal to the output signal.

16. The method of claim 15, further comprising:
receiving the second signal via a directional coupler with different coupling factors for different signal directions.

17. An apparatus, comprising:
a transmitter configured to transmit an output signal;
a first receiver path configured to receive a first signal from an antenna that captures a combination of a target signal transmitted from another apparatus to the apparatus and the output signal;
a coupler configured to generate a second signal based on the output signal;
a second receiver path configured to receive the second signal;

a noise cancellation module configured to cancel from the first signal noise due to the output signal based on the second signal; and a controller configured to turn on the second receiver path when a received signal strength indication (RSSI) of the first receiver path is lower than a threshold.

18. The apparatus of claim 17, wherein the coupler is a directional coupler with different coupling factors for different signal directions.

19. An apparatus, comprising:
a transmitter configured to transmit an output signal;
a first receiver path configured to receive a first signal from an antenna that captures a combination of a target signal transmitted from another apparatus to the apparatus and the output signal;
a coupler configured to generate a second signal based on the output signal;
a second receiver path configured to receive the second signal; and
a noise cancellation module configured to cancel from the first signal noise due to the output signal based on the second signal, wherein:

the first receiver path is configured to down-convert the first signal into baseband;

the second receiver path is configured to down-convert the second signal into baseband; and the noise cancellation module is configured to perform baseband processing to cancel the noise from the first signal.

20. The apparatus of claim 19, wherein the first receiver path and the second receiver path are designated to a transceiver circuit and the transmitter configured to transmit an output signal is designated to another transceiver circuit.

21. The apparatus of claim 19, wherein the first receiver path and the second receiver path are configured to down-convert the first signal and the second signal based on a same local oscillation signal.

22. The apparatus of claim 19, wherein the coupler is a directional coupler with different coupling factors for different signal directions.

* * * * *